Figure 1:
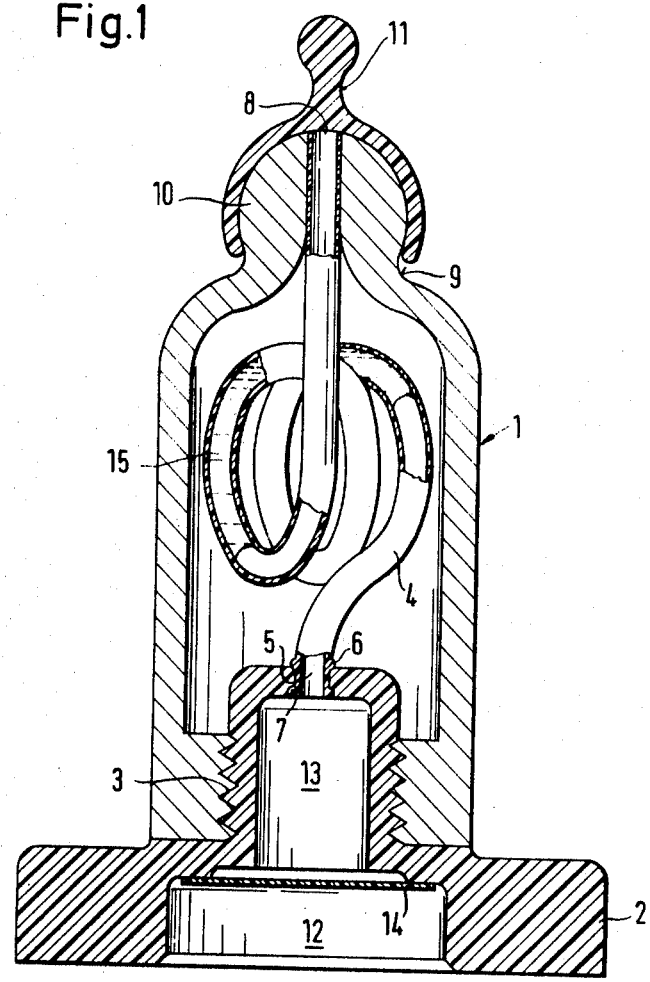

United States Patent [19]
Geller et al.

[11] 3,739,951
[45] June 19, 1973

[54] DEVICE FOR THE DISPENSING OF A SINGLE DOSE OF A LIQUID

[75] Inventors: Leo Geller, Basel; Georg Wolfgang, Riehen, both of Switzerland

[73] Assignee: Ciba-Geigy Corporation, Ardsley, N.Y.

[22] Filed: Mar. 14, 1972

[21] Appl. No.: 234,549

[30] Foreign Application Priority Data
Mar. 16, 1971 Switzerland.................... 3861/71

[52] U.S. Cl. ............... 222/193, 128/225, 222/325, 222/399
[51] Int. Cl. ............................................. B67d 5/54
[58] Field of Search ................... 222/80, 183, 193, 222/325, 399; 128/173, 225, 266; 239/307

[56] References Cited
UNITED STATES PATENTS
2,445,653   7/1948   White............................ 128/173 R
3,235,126   2/1966   Shay............................. 222/399 X Primary Examiner—Robert B. Reeves
Assistant Examiner—Larry Martin
Attorney—E. F. Wenderoth, John E. Lind, A. Ponack et al.

[57] ABSTRACT

Dispensing device for the dosified dispensing of liquid substances, comprising a casing having a dispensing outlet and an end face part having a propellent inlet opening therein, removable sealing means for the dispensing outlet and sealing means for the inlet opening, the end face part being adapted to be attached to a propellent container;

a storage element is contained in the casing and is connected with its one end to the said dispensing outlet and with its other end to the said inlet opening; this storage element is destined for holding therein the specific dose of liquid to be dispensed.

At least the portion of said storage element which is connected to the inlet opening is dimensioned to have a capillary effect on a liquid contained in the storage element so as to leave a gas pocket free between the liquid and the inlet opening, whereby a displacement of the liquid in the storage element can be impeded when the dispensing device is shaken.

Preferably the storage element consists of a wound piece of hose or tubing having at least one and preferably two or three turns.

11 Claims, 5 Drawing Figures

DEVICE FOR THE DISPENSING OF A SINGLE DOSE OF A LIQUID

The invention relates to a device for the dispensing of liquid substances, the said device comprising a dispenser which contains the entire amount of liquid substance to be delivered all at once, and which can be connected to a propellant reservoir from which, on actuation of the dispenser, a preferably gaseous propellant is forced through the dispenser to effect the fullest possible removal of the amount of liquid stored therein and the transfer of the ejected liquid to the desired point of application.

Methods are already known by which liquids and also powders may be dispensed in specific amounts from an aerosol container in which the liquids or powders are mixed with a gaseous propellant, such as highly halogenated lower alkanes (e.g. Freon), butane/propane mixtures, carbon dioxide and/or nitrogen, by the opening of a dosing valve mounted on the container. A suitable dosing valve is described in the German Patent 1,149,308 (published 22.5.1963).

Rubber balls and the like serving to produce a short puff of compressed air have also been used as propellant sources, e.g. in the device described in the U.S. Pat. No. 2,519,555 (granted 22.8.1950), concerning a dispenser for the dispensing of pulverulent medicaments.

With the known devices, however, there is difficulty in obtaining an accurate dosage, particularly in the case of very small amounts extending, for example, down to a few milligrams, either because of the fact that the design of correspondingly small dosing valves with correspondingly accurate dimensioning and low tolerances is too complicated and expensive, or because of the fact that the complete removal of the stored amount of liquid from the dispenser and the transfer of this amount to the point of application cannot be guaranteed.

The known devices having a dispensing system fed from a propellant source operate frequently with inadequate accuracy or reliability, particularly with the dispensing of liquids in the case of which an excess of the prescribed dose would be harmful, as, for example, in the application of strictly defined single doses of highly effective medicaments; but also in other fields, e.g. in the application of accurately prescribed amounts of a liquid agent which in a larger amount would be too poisonous or too explosive, or dangerous in some other manner. This would apply with regard to the application of liquids also in the case of the dispenser for finely dispersed powders known from the British Patent No. 898,649 of the Berger Laboratories Ltd., the design of the said dispenser being such that a specific dose of the powder is fed into the holding space of a two-part cartridge, a small aperture being provided in the end face of each of the two parts of the cartridge, the two parts, after filling, being tightly connected together, the lower part having an aperture of, e.g. 0.20 to 0.4 mm, and the upper part an aperture of about 0.8 to 1.0 mm diameter. With normal handling of the cartridge, it is intended that the powder shall not escape from these apertures which, moreover, remain before use sealed by polyethylene sealing rings, but shall be blown out or sucked out on use by a stream of air. A liquid fed into this cartridge of the Berger Laboratories Ltd. can, on handling of the device, penetrate into the apertures in the end faces and thus onto the polyethylene rings or sheets sealing the apertures; and a small part of the liquid dose can be lost, or not ejected, as a result of removal of the seals.

The invention relates therefore to the provision of a device which renders possible the application of very minute but accurately controlled doses of a liquid to a desired point, the said device being used in conjunction with a source of preferably gaseous propellant as the dispensing and transporting agent. The invention also concerns apparatus consisting of such a device in the form of a dispenser in combination with a suitable source of propellant.

The device according to the invention for the dosified dispensing of liquid substances, which device has none of the above mentioned disadvantages and satisfies the described requirements, comprises a dispensing device provided with an outlet aperture which can be sealed, and with an end face sealed off before use and attachable for use to a propellant reservoir, the said dispenser being fitted inside with a storage component of which the two ends are closed before use but open for use, and which is designed to contain the dose of liquid to be dispensed, the said device being characterized in that the storage unit is connected at its one end to the dispensing outlet and at its other end to the mentioned end face, and is designed to exert a capillary effect on the contained liquid according to the viscosity of the liquid, the resulting capillary effect sufficing to hold the amount of liquid in its position within the storage unit; and in that between the liquid and at least the mentioned end face of the dispenser, where the dispenser is connected to the propellant source, there remains until the device is operated, i.e. during handling before use, e.g. with removal of the device from its packing, mounting on to a propellant container, etc., a space empty of liquid, i.e. a gas pocket which can be filled either with air or with an inert gas (nitrogen, argon, etc.). This gas pocket impedes a displacement of the liquid in the storage unit when shaking of the device occurs. Such gas pockets are preferably provided at both open ends of the storage unit.

This measure prevents the possibility that, on the seal of the dispenser being pierced by the lead-in component of the propellant container, or on being replaced by the latter, e.g. by the value stem of the dosing valve of an aerosol propellant container, a portion of the stored liquid is lost by it flowing out, or is prematurely expelled by the available amount of propellant, which preferably is likewise dosified.

It was established that it is practically impossible to spray out all at once with one shot of propellant gas an amount of liquid of ca. 30–60 mg quantitatively from a straight portion of tubing which is not designed to have capillary end sections. Furthermore, the holding of an amount of liquid of this order in a specific part of such a tube is practically impossible.

It has been discovered, however, that a portion of tubing formed longitudinally into a coil having a double turn provides an ideal solution with regard to fixing and quantitatively spraying an amount of liquid with only one shot of propellant. If the upper or lower part or both ends of the coil are sealed, then it is practically impossible for the liquid, irrespective of the position in which the tubing is placed, to be displaced from the section of the coil in which it is located.

The preferred form of storage element is therefore a length of hose or tubing having an inside diameter capable of providing the desired capillary effect, and bent so that a coil of at least one turn is obtained. A design of tubing which has proved very satisfactory is one in which the middle section of the tube is shaped as a coil having two to three turns.

Other geometrical forms are however applicable, provided that they ensure the fixing of the desired amount of liquid in the middle section of the tubing; e.g. the center portion of the tube may be arranged in spiral or zigzag form.

According to a further embodiment, the end sections of the tubing serving as the storage unit, i.e., the one end section terminating in the outlet or dispensing aperture of the dispenser and the other, sealed before use, terminating at the aforementioned end face designed to provide means of connection with the propellant container, are shaped as capillary tubes preventing any passage of liquid even in the case of fairly violent handling of the dispenser, whilst the central section of the tubing is bulged out and can have, for example, the form of a sphere, an ellipsoid, a double cone or suchlike, i.e. a circular, an oval, a rhombic, or similar axial cross-section.

The storage unit is preferably made of synthetic material, e.g. polyethylene or polyamide (e.g. Nylon), or polytetrafluoroethylene (e.g. Teflon), or also of glass or metal, particularly of non-corroding metals such as $V_2A$-steel, silver, gold, copper alloys, eloxadized aluminum, etc., the material having to be suitable for the producing of capillar tubes of suitable dimension. For certain liquids it is also possible to use rubber hose, provided that this does not become decomposed by the liquids on prolonged storage.

For liquids having a viscosity of about 10 to 50 Centipoise (at 20°C), tubes with an inside diameter of about 0.8 to 1.5 mm and having one to two turns are especially satisfactory. Larger inside diameters are to be used in the case of a higher viscosity of the liquid to be stored, and correspondingly narrower capillaries with lower viscosity.

Liquids which can be stored in a dispenser according to the invention are preferably solutions, suspensions or emulsions of active substances, e.g. of substances having pharmaceutical or pesticidal activity, or of substances effective in technical fields. Suitable carriers and/or solvents are, in particular, oils such as sesame oil, ethyloleate and similar alkyl esters of aliphatic acids, also propylene glycols of the mentioned viscosity range, and, finally, also silicone oils and suchlike, e.g. a dimethyl silicone oil having a viscosity of 25 Centipoise and a refractive index of about 1.46, both at 25°C. Aqueous solutions, suspensions or emulsions with suitable substances for increasing viscosity, e.g. sodium carboxy-methyl cellulose, cellulose ethers, gel-forming natural substances such as, e.g. agar-agar, tragacanth and gelatine, are likewise suitable.

Active substances which can be suspended, emulsified or dissolved in the above mentioned carriers can belong to the most diverse classes. In the case of application for inhalation, for example, medicaments such as 1-(3,4-dihydroxyphenyl)-2-isopropylamino-ethanol-sulphate for nasal administration, and active substances such as 2-(4-tert-butyl-2,6-dimethyl-3-hydroxybenzyl)-2-imidazoline-hydrochloride-sulphate, can be suspended, emulsified or dissolved in the desired concentration in one of the above carriers, and the obtained preparation fed into the dispenser according to the invention, e.g.:

a. an aqueous solution consisting of, as a single dose, 0.075 mg of isoproternol* (*Merck Index 8th Edition) in 35 mg of an aqueous Na-CMC solution (viscosity of 10 cps), applicable as inhalation spray (CMC = carboxymethyl cellulose);

b. a suspension consisting of, as a single dose, 0.033 mg of oxymethazoline* (*Merck Index 8th Edition) in 40 mg of Mygliol 812 neutral oil (triglycerides of saturated fatty acids of the chain-length $C_8$–$C_{12}$), applicable as nasal spray.

The new device has proved particularly successful for the nasal administration (i.e. through the nasal mucous membrame) of physiologically active peptide compounds. Such peptide compounds are, e.g. insulin, growth-promoting hormone, glucagon, thyrotropin, luteotropin-releasing hormone, thyrotropin-releasing hormone, vasopressing, bradykinin, etc, also hypertensin and its analogues, principally calcitonins and, in particular, peptides having MSH- and ACTH-effect.

To the last-mentioned belong the peptides having the structure of the natural MSH- and ACTH-peptides, and synthetic peptides with shorter and/or, with regard to certain amino acids, modified amino acid sequence. Synthetic peptides having ACTH-effect are, e.g. those which have at least 16, preferably 18–28, amino acids, calculated from the amino end of the corticotrophin, and optionally a modified amino acid composition. Thus, in particular, the amino acids 1–5, 11, 15–18 and 25–33 can be replaced by amino acids other than those corresponding to the natural sequence, e.g. the serine radicals serine$^1$ and/or serine$^3$ by glycine or alanine, tyrosine$^2$ by phenyl-alanine, methionine$^4$ by $\alpha$-amino-lower-alkylacetic acid wherein lower alkyl contains 2–4 carbon atoms, e.g. norvaline, valine, norleucine, leucine, isoleucine, $\alpha$-aminobutyric acid, glutamic acid$^5$ by glutamine, lysine$^{11}$ and lysine$^{15,16}$ by ornithine, arginine$^{17,18}$ by lysine or ornithine, amino acid$^{25}$ by valine. Serine$^1$ can also be replaced, e.g. by proline, $\alpha$- or $\beta$-alanine, threonine, propionic acid, $\beta$-aminopropionic acid, $\beta$-hydroxypropionic acid, $\gamma$-aminobutyric acid, $\alpha$-aminoisobutyric acid, phenylglycine or -aminocaproic acid. All the amino acids, with the exception of those in the N-terminal 1-position, necessarily have L-configuration. The new preparations preferably contain ACTH-effective peptides of which the first amino acid has D-configuration, particularly D-serine; also preferably used are peptides having a chain length of 18–25 amino acids, especially with 18 amino acids. To be emphasized also are preparations which contain C-terminal amides of the mentioned ACTH-effective peptides, particularly such of peptides with a sequence of 18 amino acids, principally D-Ser$^1$-Lys$^{17,18}$-$\beta^{1-18}$-corticotropin-Lys$^{18}$-amide, also, e.g. D-Ser$^1$-corticotropin-Arg$^{18}$- amide, D-Ser$^1$-Orn$^{11}$-Lys$^{17,18}$-$\beta^{1-18}$-corticotropin-Lys$^{18}$-amide, D-Ser$^1$-Orn$^{11,15-18}$-$\beta^{1-18}$-corticotropin-Orn$^{18}$-amide, $\alpha$-aminoisobutyyl$^1$-$\beta^{1-18}$corticotropin-Arg$^{18}$-amide, D-Ser$^1$-Orn$^{17,18}$-$\beta^{1-18}$-corticotropin-Orn$^{18}$-amide, D-Ser$^1$-Gly$^3$-Lys$^{17,18}$-$\beta^{1-18}$-corticotropin-Lys$^{18}$-amide, D-Ser$^1$-Nle$^4$-Lys$^{17,18}$-$\beta^{1-18}$-corticotropin-Lys$^{18}$-amide, D-Ser$^1$-Lys$^{17,18}$-$\beta^{1-18}$-corticotropin, as well as $\beta^{1-19}$-corticotropin, D-Ser$^1$-$\beta^{1-19}$-corticotropin, $\beta^{1-19}$-corticotropin-Pro$^{19}$-amide, Glu(NH$_2$)$^5$-$\beta^{1-19}$-corticotropin, D-Ser$^1$-Lys$^{17,18}$-Val$^{19}$-$\beta^{1-19}$-corticotropin-Val$^{19}$-amide, D-Ser$^1$-Nle$^4$-Lys$^{17,18}$-Val$^{19}$-$\beta^{1-19}$-corticotropin-Val$^{19}$-amide, $\beta^{1-20}$-corticotropin-Val$^{20}$-amide, D-Ser$^1$-$\beta^{1-20}$-corticotropin-Val$^{20}$-amide, D-Ser$^1$-Lys$^{17,18}$-$\beta^{1-20}$-corticotropin-Val$^{20}$-amide, $\alpha$-Aminobutyryl$^4$-Glu(NH$_2$)$^5$-$\beta^{1-20}$-corticotropin-Val$^{20}$-amide, D-Ser$^1$-Lys$^{17,18}$-$\beta^{1-19}$-corticotropin-Pro$^{19}$-amide, $\alpha$-Aminobutyryl$^4$-$\beta^{1-20}$-corticotropin-Val$^{20}$-amide, $\beta^{1-21}$-corticotropin, D-Ser$^1$-Lys$^{17,18}$-$\beta^{1-21}$-corticotropin-Lys$^{21}$-amide, D-Ser$^1$-Lys$^{17,18}$-$\beta^{1-22}$-corticotropin-Val$^{22}$-amide, $\beta^{1-23}$-corticotropin, $\beta^{1-23}$-corticotropin-Tyr$^{23}$-amide, $\beta$-Ala$^1$-$\beta^{1-23}$-corticotropin-Tyr$^{23}$-amide, D-Ser$^1$-$\beta^{1-23}$-corticotropin-Tyr$^{23}$-amide, D-Ser$^1$-Ala$^3$-$\beta^{1-23}$-corticotropin-Tyr$^{23}$-amide, Gly$^1$-$\beta^{1-23}$-corticotropin-Tyr$^{23}$-amide, D-Ser$^1$-Lys$^{17,18}$-$\beta^{1-23}$-corticotropin-Tyr$^{23}$-amide, $\beta^{1-24}$-corticotropin, Glu(NH$_2$)$^5$-$\beta^{1-24}$-corticotropin, D-Ser$^1$-Orn$^{17,18}$-$\beta^{1-24}$-corticotropin, Gly$^{1,3}$-$\beta^{1-24}$-corticotropin, Orn$^{17,18}$-$\beta^{1-24}$-corticotropin, Lys$^{17,18}$-$\beta^{1-24}$-corticotropin, D-Ser$^1$-Nle$^4$-$\beta^{1-24}$-corticotropin, D-Ser$^1$-$\beta^{1-24}$-corticotropin, D-Ala$^1$-$\beta^{1-24}$-corticotropin, D-Ser$^1$-Gly$^3$-Lys$^{17,18}$-$\beta^{1-24}$-corticotropin, D-Ser$^1$-Nle$^4$-Lys$^{17,18}$-$\beta^{1-24}$-corticotropin-Pro$^{24}$-amide, D-Ser$^1$-Orn$^{17,18}$-$\beta^{1-24}$-corticotropin-Pro$^{24}$-amide, D-Ser$^1$-Nle$^4$-Orn$^{17,18}$-$\beta^{1-24}$-corticotropin-Pro$^{24}$-amide, D-Ser$^1$-Gly$^3$-Lys$^{17,18}$-$\beta^{1-24}$-corticotropin-Pro$^{24}$-amide, D-Ser$^1$-Gly$^3$-Lys$^{17,18}$-$\beta^{1-24}$-corticotropin-Pro$^{24}$-amide, D-Ser$^1$-Lys$^{17,18}$-$\beta^{1-24}$-corticotropin, D-Ser$^1$-Lys$^{17,18}$-$\beta^{1-24}$-corticotropin-Pro$^{24}$-amide, D-Ser$^1$-Nle$^4$-Val$^{25}$-$\beta^{1-25}$-corticotropin-Val$^{25}$-amide, D-Ser$^1$-Nle$^4$-D-Val$^{25}$-$\beta^{1-25}$-corticotropin-D-Val$^{25}$-amide, D-Ser$^1$-Nva$^4$-Lys$^{17,18}$-Val$^{25}$-$\beta^{1-25}$-corticotropin-Val$^{25}$-amide, $\beta^{1-25}$-corticotropin-Val$^{25}$-amide, D-Ser$^1$-Nle$^4$-Lys$^{17,18}$-Val$^{25}$-$\beta^{1-25}$-corticotropin-Val$^{25}$-amide, Nle$^4$-Val$^{25}$-$\beta^{1-25}$-corticotropin-Val$^{25}$-amide, Nva$^4$-Val$^{25}$-$\beta^{1-25}$-corticotropin-Val$^{25}$-amide, Nle$^4$-Lys$^{17,18}$-Val$^{25}$-$\beta^{1-25}$-corticotropin-Val$^{25}$-amide, $\beta^{1-26}$-corticotropin, $\beta^{1-28}$-corticotropin, $\beta^{1-30}$-corticotropin, $\beta^{1-31}$-corticotropin, $\beta^{1-39}$-corticotropin, D-Ser$^1$-$\beta^{1-39}$-corticotropin, Gly$^1$-$\beta^{1-39}$-corticotropin.

$\alpha$-MSH-Peptides which have an effect of regulating the liberation of the growth-promoting hormone, and which can likewise be used, are, in particular, such ones having the sequence of the first 11–16 amino acids of the ACTH wherein the exchange amino acids mentioned above for ACTH can be present, and wherein the first amino acid is preferably acylated, especially acetylated, principally $\alpha$-MSH and D-Ser$^1$-$\alpha$-MSH.

Calcitonins are the known natural calcitonins such as swine-calcitonin, human calcitonin, salmon-calcitonin, cattle-calcitonin, sheep-calcitonin, as well as synthetic analogues, in which one or more amino acids are replaced by others, e.g. methionine by norleucine, or in which the first amino acid is replaced by a desamino acid or by an acylamino acid.

The amove mentioned peptides can be used in the free form or in the form of therapeutically applicable acid addition salts. Such salts are derived, e.g. from inorganic acids such as hydrohalic acids, e.g. hydrochloric acid or hydrobromic acid, perchloric acid, nitric acid or thiocyanic acid, sulphuric acid, phosphoric acid, or organic acids such as formic acid, acetic acid, propionic acid, glycolic acid, lactic acid, pyroacemic acid, oxalic acid, malonic acid, succinic acid, maleic acid, fumaric acid, malic acid, tartaric acid, citric acid, ascorbic acid, hydroxymaleic acid, dihydroxymaleic acid, benzoic acid, phenylacetic acid, 4-aminobenzoic acid, 4-hydroxybenzoic acid, anthranilic acid, cinnamic acid, mandelic acid, salicyclic acid, pamoic acid, 4-amino-salicyclic acid, 2-phenoxybenzoic acid, 2-acetoxybenzoic acid, methanesulphonic acid, ethanesulphonic acid, hydroxyethanesulphonic acid, benzenesulphonic acid, p-toluenesulphonic acid, naphthalenesulphonic acid, or sulphanilic acid, also salts with long-chain fatty acids, e.g. such with 12–22 carbon atoms such as lauric acid, tridecylic acid, myristic acid, pentadecyclic acid, palmitic acid, margaric acid, stearic acid, nonadecylic acid, arachic acid, eicosacarboxylic acid-(1), behenic acid, and corresponding unsaturated acids such as, e.g. oleic acid, elaidic acid, erucic acid, brassidic acid and linoleic acid.

For the above stated purposes the storage unit should be designed to hold a dose of about 20 to 100 mg of liquid.

The dispenser usually employed is one of which the casing consists of an upper or housing part and a base part, which are preferably made of plastic and which, after insertion of the storage unit through the base and into the outlet aperture, are connected together by screwing, or the thermal welding, or by cementing. The desired dose of liquid is then fed into the coil of the storage unit, e.g. with the aid of a hypodermic needle; the cover is afterwards placed over the top end where the delivery aperture is located, and, finally, the sealing effected of the other open end of the storage unit, this seal being situated in the dispenser-wall which is designed for subsequent connection to the propellant container, e.g. in the wall formed by the aforementioned base.

Plastic or metal sheet is used for sealing, preferably cellulose sheet, cellulose acetate sheet, polyvinyl chloride sheet, and also aluminum sheet or foil. The thickness of the sheet must not be too great so that it readily tears under a slight pressure as the dispenser is placed over the valve of a propellant container, thus enabling the upper end of the valve stem to enter a suitable recess in the dispenser base without the valve of the propellant container being opened in the insertion operation. A much greater pressure has to be applied to open the valve.

Sheet or foil having a thickness of about 40 to 100 m$\mu$, especially that made from pure cellulose, provided particularly suitable for the sealing of the junction aperture of the dispenser according to the invention.

The walls of the dispenser, of its casing and/or of its base, can naturally be made from any other suitable material besides plastic, such as, e.g. metal or glass.

The propellant source is preferably an aerosol propellant container provided with a dosing valve of known design. Particularly suitable for this purpose is one of the valves described in the above mentioned German Patent 1,149,308, or a dosing valve marketed by Solfrene S.p.A., Corsico (Milan), Italy, under the designation MT/50–75–100. Where a dosing valve is employed, it is naturally a requirement that the single dose of propellant contained by sufficient to expel the entire dose of liquid from the dispenser according to the invention. On the other hand, it is possible to use arrangements of dispenser and propellant container with dosing valve, in which the charge carried in the propellant container is designed to satisfactorily empty a specific number of dispensers, e.g. a dozen. Each dispenser is used only once and then disposed of; the propellant container, however, remains in service until the prescribed number of dispensers have been emptied. It is moreover also possible to utilize compressed-air bulbs or flasks of the type used in the U.S. Pat. No.

2,519,555; furthermore, it is possible to use aerosol propellant containers not fitted with a dosing valve; in the latter case, however, it is extremely difficult to ensure that complete dispensing of the active substance liquid from the dispenser has occurred without an unnecessary excess of propellant having been consumed.

In the case of the dispensing of nasal or inhalation sprays of the previously described type with application of an aerosol propellant container charged, e.g. with Freon, the impeding of the propellant gas flow in the first turn, where a coil is used as the storage element, results in a small amount of propellant gas being condensed, or even being dissolved, e.g. in oily solutions, emulsions or suspensions, in consequence of which it is possible to obtain a more finely divided spray of liquid from the dispenser.

Before use and after the cover has been removed the single-dose dispenser is placed on to the valve of the propellant container without pressure being applied. The dispenser is introduced into the nose or mouth. The liquid is then sprayed or expelled by the dispenser being sharply pressed down on to the propellant container. A new single-dose is used for each application.

In addition to being used as throat and inhalation sprays, dispensers according to the invention may also be used for non-medicinal purposes, e.g. in tests in which it is required to deliver or spray out small but very accurately measured doses of the active substance liquid, e.g. in lubrication tests with newly developed lubricating oils; in insecticidal tests, in which the aim is to determine the minimum effective dose for certain insects in an experimental chamber with employment of the smallest possible amounts of new test substances; and in the case of other applications where the main requirement is the utmost accuracy in the dispensing of minute doses.

Figure 2:
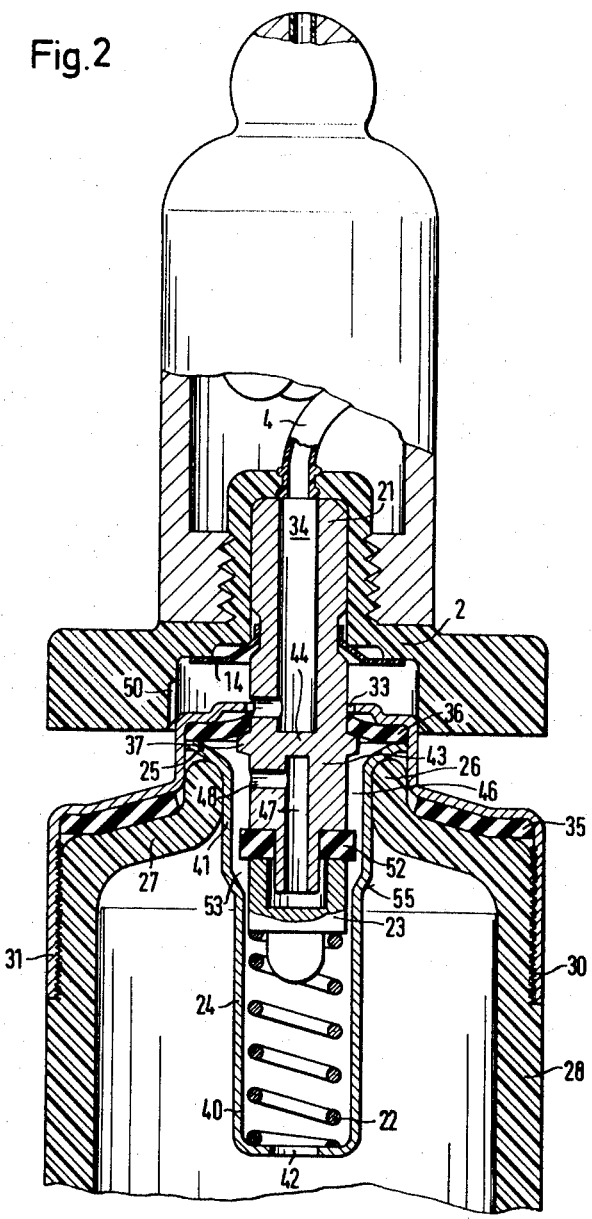
Figure 3:
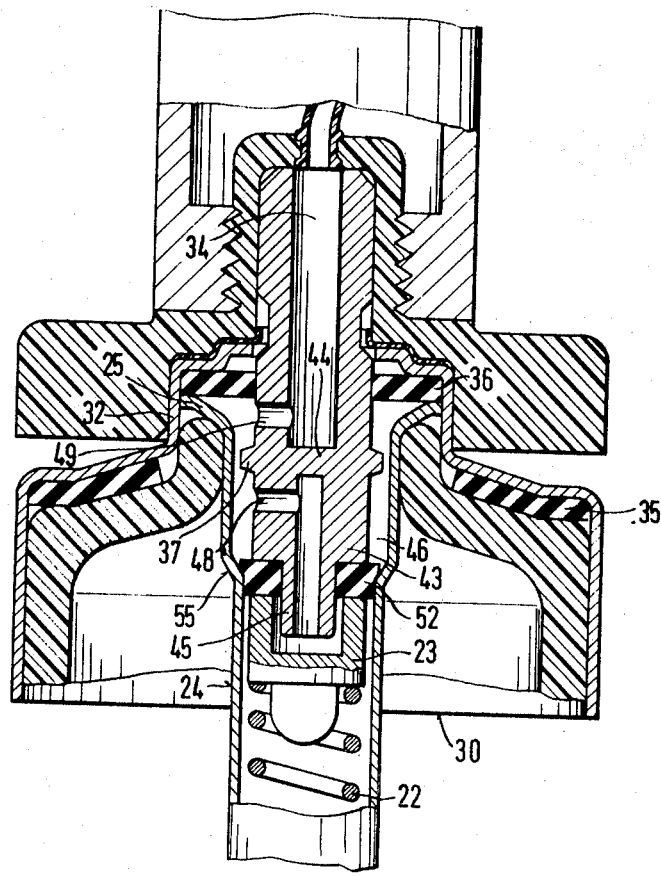
Figure 4:
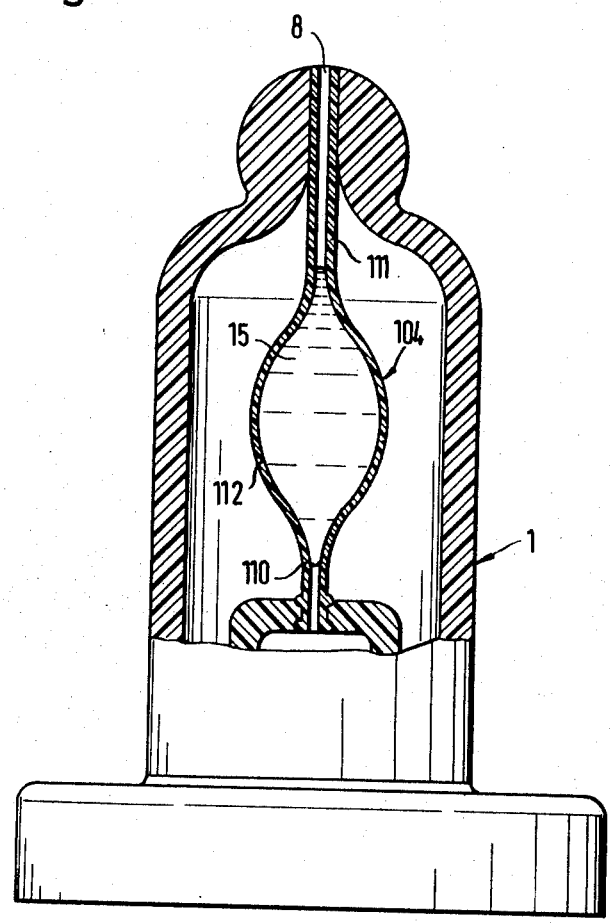
Figure 5:
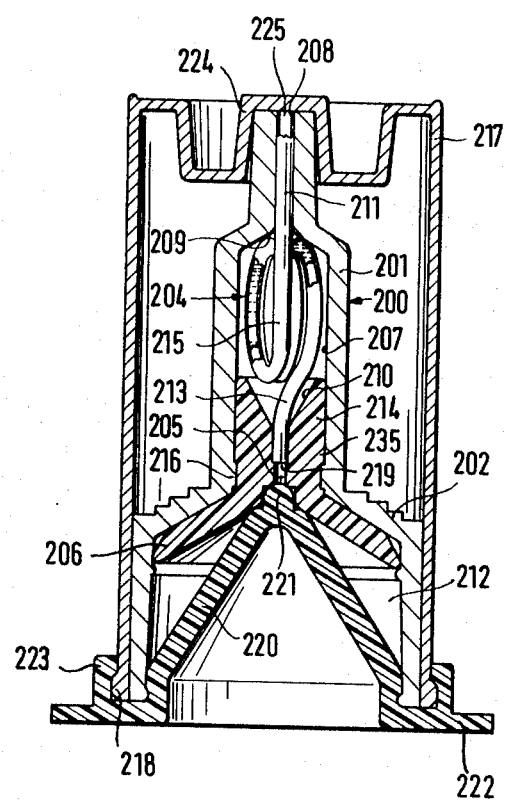

Further details of the invention are contained in the description of various embodiments thereof in conjunction with the accompanying drawings:

FIG. 1: shows a first embodiment of the single-dose dispenser, sealed at both ends and partially in cross section;

FIG. 2: shows the same dispenser, partially in cross section mounted on the dosing valve of a propellant container known per se; the dosing valve in this drawing is shown in cross section and in the sealed or closed position;

FIG. 3: shows the same arrangement as in FIG. 2, but with the valve in the spraying position;

FIG. 4: shows a further embodiment of the dispenser partly in cross section; and FIG. 5: shows a further preferred embodiment of the dispenser in longitudinal section.

The embodiment shown in FIG. 1 of the single-dose dispenser comprising a casing or housing 1 serving as the nose- or mouth- insertion-piece, a rounded base 2, which is screwed into the lower end of the casing 1 by means of the thread 3, a hose or tubing section 4 having three or more turns and preferably made of synthetic material, e.g. polyethylene, the lower open end of the said hose or tubing being inserted into a central aperture 5 of the base 2 and held, e.g. by collars 6 and 7, and the upper open end into the outlet orifice 8 of the casing 1. After insertion of the single dose of liquid to be administered, the outlet orifice 8 is sealed by a cover 11 fitting over the thickened top 10 of the casing 1 and clipping into the narrowed neck 9, the said cover being removed before application of the dispenser. In the lower open end of the base 2, a recess 12 is provided which is directly below and adjoining a hollow space 13 of lesser diameter than the recess 12, the base 2 being sealed across its lower inner face, after filling of the tubing 4, by a plastic or aluminum sheet 14. The central turn or turns of the tubing section 4 is or are charged with the liquid substance 15 to be sprayed; the two end portions of the tubing 4, however, contain no liquid substance.

FIG. 2 and 3 show the dispenser in the position in which the base 2 is sitting on top of the dosing valve of a propellant container 20, the design being such that in the said position the valve stem 21 of the dosing valve has pierced the aluminum foil 14, and penetrated with its upper end into the hollow space 13, the top end of the stem being thus directly in contact with the upper end face of the hollow space 13 in FIG. 1, the valve stem 21 remaining, however, by virtue of the pressure of the spring 22 against the valve spring cap 23, in the sealed position. The cover 11 has already been removed.

The dosing valve known per se comprises, besides the stem 21 and valve spring cap 23, the valve housing 24 the sprayed out upper edge 25 of which locates on the edge 26 of the neck 27 of a propellant container 28, and the valve cap 30, which is rigidly connected with the upper part of the wall of the propellant container 28, e.g. by means of the thread 31, and which has a dome-shaped part 32 situated above the valve housing 24, the dome-shaped part 32 being provided with a central opening 33, through which penetrates the upper end of the valve stem 21, the latter having an axial bore or channel 34. Between the valve cap 30 and the neck 27 of the propellant container 28 is inserted a flexible sealing ring 35, while a further flexible sealing ring 36 seals off the valve housing 24 against the cap 30, this seal 36 pressing, with the valve in the closed position, tightly against the upper face of the annular flange 37 of the valve stem 21.

The compression spring 22 is located in the lower part 40 of the valve housing 24, this lower part 40 having a somewhat smaller diameter than the upper part 41 with its widened top edge 25, the lower part 40 being provided in its base with an inlet aperture 42 for propellant from the container 28. Below the flange 37, the valve stem 21 extends downward in the form of a hollow cylinder 43, the interior of which at the top is separated from the cylindrical bore 34 by a solid section 44. The flange 37 and the hollow cylindrical part 43 of the valve stem 21 slide with clearance inside the upper part 41 of the valve housing 24. The lower part 45 of the hollow cylinder 43 has a reduced diameter and extends into the valve spring cap 23 in the lower part 40 of the valve-housing 24. Between the outer face of the hollow cylindrical portion 43 and the inner wall of the upper part of the valve housing 41 there is formed an annular space 46, which constituted the dosing space for the propellant. In the wall of the hollow cylindrical part 43 there is provided, approximately level with the upper end of the cylindrical bore 47, a connecting aperture 48 so as to provide a connection between the dosing space 46 and the interior of the valve spring cap 23 via the cylindrical bore 47. From the lower end of the bore 34 of the valve stem 21 there is arranged an aperture 49 which, in the inoperative position, is situated just above the sealing ring 36 so that, in this position, the bore 34 is connected with the atmosphere. This condition obtains, by virtue of the lateral slot 50 in the inside wall of the base 2, even when the dispenser is mounted as in FIG. 2.

The end portion 45 of the valve stem 21 extends into the central cavity of the valve spring cap 23, and there is arranged a sealing ring 52 between the hollow cylindrical part 43 having the full diameter of the valve stem 21 and the upper edge of the valve spring cap 23.

In the closed or inoperative position of the dosing valve, the dosing space 46 is connected, via the annular space 53 existing between the valve spring cap 23 and the inside wall of the bottom part of the valve housing 40, the interior space of the lower part of the housing 40 situated below the valve spring cap 23, and the aperture 42 in the base of the lower part of the valve housing, with the interior of the propellant container 28, while the flange 37 of the valve stem 21 is located against the sealing ring 36 thus preventing any escape of the gaseous propellant.

If, after the outlet aperture 8 has been directed on to the point to be treated, the valve stem is moved, with compression of the spring 22, into the valve housing, this movement being effected by a reasonable amount of pressure on the dispenser base 2, which can be applied, e.g. with two fingers while the container 28 is held in the same hand, then the device is in the spraying position shown in FIG. 3. In this position, the sealing ring 52 becomes pressed into the necking part 55 between the upper part 41 of the valve housing and the lower part 40, with the result that no further propellant can flow from the inside of the container 28 into the dosing space 46. At the same time, the flange 37 has moved downwards from the sealing ring 36, and the aperture 49 moves to a position below this sealing ring so that, in this position, the dosing space 46 is connected, via the interspace between the flange 37 and the inside wall of the upper part 41 of the valve housing, and via the aperture 49, with the central channel 34, the propellant from the dosing spade 46 being then able to expel the active substance liquid 15 from the turns of the tubing unit 4 and cause it to spray out from the orifice 8 of the dispenser head 10.

The emptied dispenser is now removed from the valve of the propellant container, the valve shaft 21 returns to its inoperative position (FIG. 2), thus enabling a fresh dose of propellant to flow into the dosing space 46; after positioning of a new loaded dispenser, the process can then be repeated.

FIG. 4 shows a similar dispenser as illustrated in FIGS. 1 to 3, but the storage unit 104 in this embodiment has a different design; this embodiment comprises two end zones 110 and 111 forming capillaries, and a bulged-out central zone 112. This widened zone in FIG. 4 is of distaff form having approximately a rhombic cross section; it can, however, also be oval or circular in cross section.

The preferred embodiment shown in FIG. 5 of a single-dose dispenser according to the invention comprises the casing 200 having a thinner upper end compared with the main part 201 of the casing 200, designed for insertion, e.g. into the nose, and a base part 202 which widens out downwards and is open at the base. The upper straight end section 211 of the spiral-shaped storage element 204 is firstly inserted from below, through the recess 212 formed by the widened base part 202, into the outlet aperture 208 arranged in the longitudinal axis of the main part 201 of the casing 200. the set of coils 215 thus coming up at 209 against the wall of the casing interior 207. The lower straight end section 213 of the storage element 204 is pushed into the centrally arranged axial inlet channel 205 in the neck 214 of an internal plug member 206 which, by means of a thickened section 215 on the inside end of the neck 214, is snapped into place over the internal projection 216 of the base part 202, the neck 214 thus sealing against the lower inside wall of the casing interior 207. The set of turns 215 is located on the upper end of the neck at 210.

Insertion of a single dose of the liquid to be sprayed is effected, with open end sections 211 and 213 of the storage element 204, by means of an injection syringe, the needle of which is inserted into the bore of the upper end section 211. The top outlet aperture 225 is sealed on storage by a cover 217, the lower open end of which is level with and surrounds the lower edge of the base part 202. On the outer bottom rim of the cover 217 is provided an annular projection 218. The lower aperture 219 of the inlet channel 205 is sealed by the nipple 221 of an essentially conically shaped sealing member 220 designed with its bottom edge bent up to form a collar 222, this collar being provided on the inside of its upper open end with an annular thickening or rim 223, which positively engages over the lower projecting rim 218 of the cover 217, thus firmly holding together the assembly formed by casing 200, cover 217 and sealing member 220. The upper central part of the cover 224 is pressed onto the top end of the casing 201, thus tightly sealing the aperture 225 of the outlet channel 208, and the nipple 221 firmly against the inner aperture 219 of the inlet channel 205 of the plug member 206, the result being that the upper and the lower apertures of the storage unit 204 are maintained hermetically sealed. The cushions of air present at both ends of the capillaries in the straight sections 211 and 213 impede a premature displacement of the amount of liquid inside the set of turns 215, and prevent separated threads of liquid forming in the capillary end sections as a result of shaking, and the possibility of liquid itself reaching the sealing elements 221 and 224.

To put the device into operation, the sealing member 220 is firstly withdrawn downwards, and the valve stem of an aerosol propellant container, or similar propellant source, inserted into the opening 219 of the inlet channel 205 in the neck 214 of the plug member 206; the cover 217 is then removed, whereupon a small amount of propellant suffices to eject in spray form the complete dose of liquid from the set of turns 215 and through the outlet channel 208 and, finally, through the aperture 225.

We claim:

1. Dispensing device for the dosified dispensing of liquid substances, comprising a casing having a dispensing outlet and an end face part having a propellant inlet opening therein, removable sealing means for said dispensing outlet and sealing means for said inlet opening, said end face part being adapted to be attached to a propellant container, a storage element contained in said casing and connected with its one end to said dispensing outlet and with its other end to said inlet opening, said storage element being destined for holding therein the specific dose of liquid to be dispensed, at least the portion of said storage element connected to said inlet opening being dimensioned to have a capillary effect on a liquid contained in said storage element so as to leave a gas pocket free between the liquid and said inlet opening, whereby a displacement of the liquid in the storage element can be impeded when said dispensing device is shaken.

2. Device as described in claim 1, wherein the storage element consists of a wound piece of hose or tubing having at least one turn.

3. Device as described in claim 1, wherein said storage element consists of a tubing made of a material suitable for the producing of capillary tubes having a capillary effect to suit the viscosity and adhesion of the liquid to be stored.

4. Device as described in claim 3, wherein said tubing is made of polyethylene, polyamide, polytetrafluoroethylene, glass or metal, and has at least two turns.

5. Device as described in claim 1, wherein said storage element has an inside diameter of about 0.8 to 1.5 mm, corresponding to a viscosity of the liquid to be stored therein of about 10 to 50 Centipoise at 20°C.

6. Devise as described in claim 5, wherein the length of said storage element is such that a maximum dose of liquid of 20 to 100 mg can be held therein.

7. Devise as described in claim 1, wherein the sealing of said end face comprises a plastic or metal foil, which is sufficiently thin that it can be pierced on application of the dispensing device to a propellant container, without the pressure required for this operation being sufficient to effect the discharge of propellant from the propellant container into the dispensing device.

8. Device as described in claim 7, wherein said foil is made from cellulose, cellulose acetate, polyvinyl chloride or aluminum, and has a thickness of about 40 to 100 millimicrons.

9. Device as described in claim 1, further comprising a removable cover, hermetically sealing said dispensing outlet.

10. Device as described in claim 1, further comprising a sealing member being firmly and detachably connected to the said end face, or inserted into a recess of the latter.

11. Device as described in claim 1, wherein said storage element has its two ends shaped to form capillary tubes, so that there remain, after introduction of the dose of liquid into the storage element, pockets of gas in both capillary ends, which suppress a displacement of the liquid in the storage element when shaking of the latter occurs.

* * * * *